United States Patent [19]
Buckshaw et al.

[11] 3,761,656
[45] Sept. 25, 1973

[54] GROUNDING MEMBER FOR WATER LEVEL CONTROL DEVICE

[75] Inventors: Thomas M. Buckshaw; David M. Rosenberg, both of Indiana, Pa.

[73] Assignee: Robertshaw Controls Company, Richmond, Va.

[22] Filed: Mar. 9, 1972

[21] Appl. No.: 233,227

[52] U.S. Cl. .................... 200/83 WM, 317/18 A
[51] Int. Cl. .................................................. H01r 3/04
[58] Field of Search ............... 200/166 BH, 83 WM; 317/18 A

[56] References Cited
UNITED STATES PATENTS
3,609,272   9/1971   Heaps .................... 200/83 WM
3,351,813   11/1967  Trout ..................... 317/18 A
3,243,657   3/1966   Towles .................... 317/18 A
2,806,993   9/1957   Matousek ............... 317/18 A X Primary Examiner—J. V. Truhe
Assistant Examiner—William J. Smith
Attorney—Auzville Jackson, Jr. et al.

[57] ABSTRACT

A water level control device having a mounting bracket formed of electrically conductive material and a cover member formed of electrically conductive material that is spaced from the bracket by an electrically non-conductive body member. A conductive strap is carried by the device and is disposed in contact with the bracket and with the metallic cover so that when the bracket is attached to a grounded frame structure of an appliance, the conductive cover will also be grounded.

6 Claims, 2 Drawing Figures

PATENTED SEP 25 1973 3,761,656

GROUNDING MEMBER FOR WATER LEVEL CONTROL DEVICE

This invention relates to an improved water level control device as well as to an improved method of making such a water level control device or the like.

It is well known that water level control devices are formed from a plurality of parts, some of which are electrically conductive and others of which are electrically non-conductive. Such water level control devices are utilized with laundry washing apparatus for the purpose of sensing the water level therein and through such sensing, causing the apparatus to operate in a predetermined manner, such as automatically turning off the water that is flowing into the washing compartment when the water level reaches a predetermined level therein.

It has been found according to the teachings of this invention that since the mounting bracket for such water level control device is mounted to the grounded frame structure of the appliance and is usually formed of electrically conductive material, other exposed conductive parts of the water level control device that are spaced from such mounting bracket by the non-conductive part or parts of the water level control device so as to be electrically isolated from the bracket could be effectively grounded if a conductive member were disposed in contact with the mounting bracket and the respective con-ductive part that is normally electrically isolated therefrom.

Accordingly, it is a feature of this invention to effectively ground an electrically conductive part of a water level control device to the mounting bracket with a conductive member so that when the mounting bracket is attached to a grounded frame structure, the conductive part will also be grounded.

In particular, one embodiment of this invention provides a water level control device having a mounting bracket formed of electrically conductive material and a cover member for the water level sensing diaphragm formed of electrically conductive material and being secured in a crimped manner to an annular flange of a non-conductive body part that separates the mounting bracket from the cover. A conductive strap is secured at one end thereof to the control device by the same fastening member that fastens the bracket to the non-conductive body part whereby the strap is in conductive contact with the metallic bracket. The other end of the metallic strap is crimped between the non-conductive body part and the crimping portion of the cover member to not only be secured to the control device, but also to be electrically connected to the cover member so that when the mounting bracket is subsequently attached to a grounded frame structure, the conductive strap will also ground the metallic cover. In this manner, all of the exposed metallic or conductive parts of the water level control device are effectively grounded whereby no hazardous build up of electrical charge can take place on the exposed portions of the control device. Such adverse charge could be created by a short occurring from the electrical switch of the control device to one of the exposed conductive parts thereof.

Accordingly, it is an object of this invention to provide an improved water level control device having one or more of the novel features set forth above or hereinafter shown or described.

Another object of this invention is to provide an improved method for making such a control device or the like.

Other objects, uses, and advantages of this invention will become apparent from a reading of this description which proceeds with reference to the accompanying drawings forming a part thereof and wherein.

Figure 1:
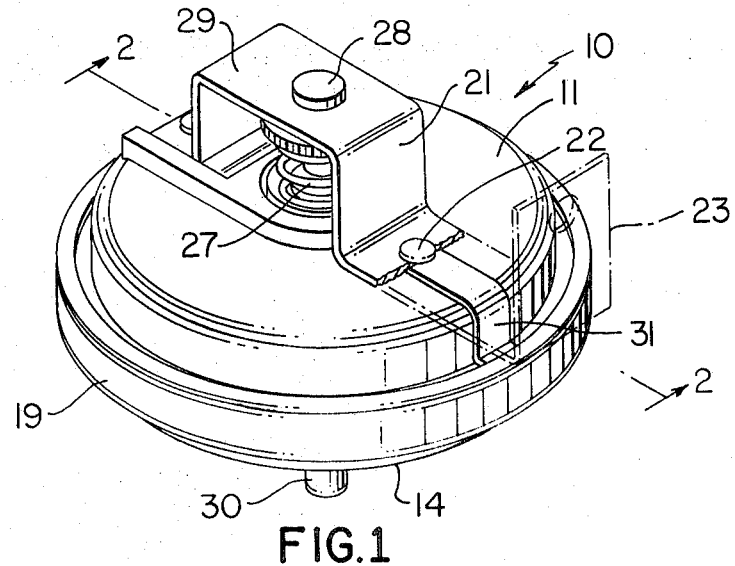
FIG. 1 is a top perspective view of the improved water level control device of this invention with part of the mounting bracket thereof shown in phantom to expose in elevation part of the grounding strap of this invention.

While the various features of this invention are hereinafter described and illustrated as being particularly adapted for grounding a metallic cover member of a water level control device to the mounting bracket thereof, it is to be understood that the various features of this invention can be utilized singly or in any combination thereof to provide grounding means for other exposed conductive parts of the control device as desired.

Therefore, this invention is not to be limited to only the embodiment illustrated in the drawings, because the drawings are merely utilized to illustrate one of the wide variety of uses of this invention.

Figure 2:
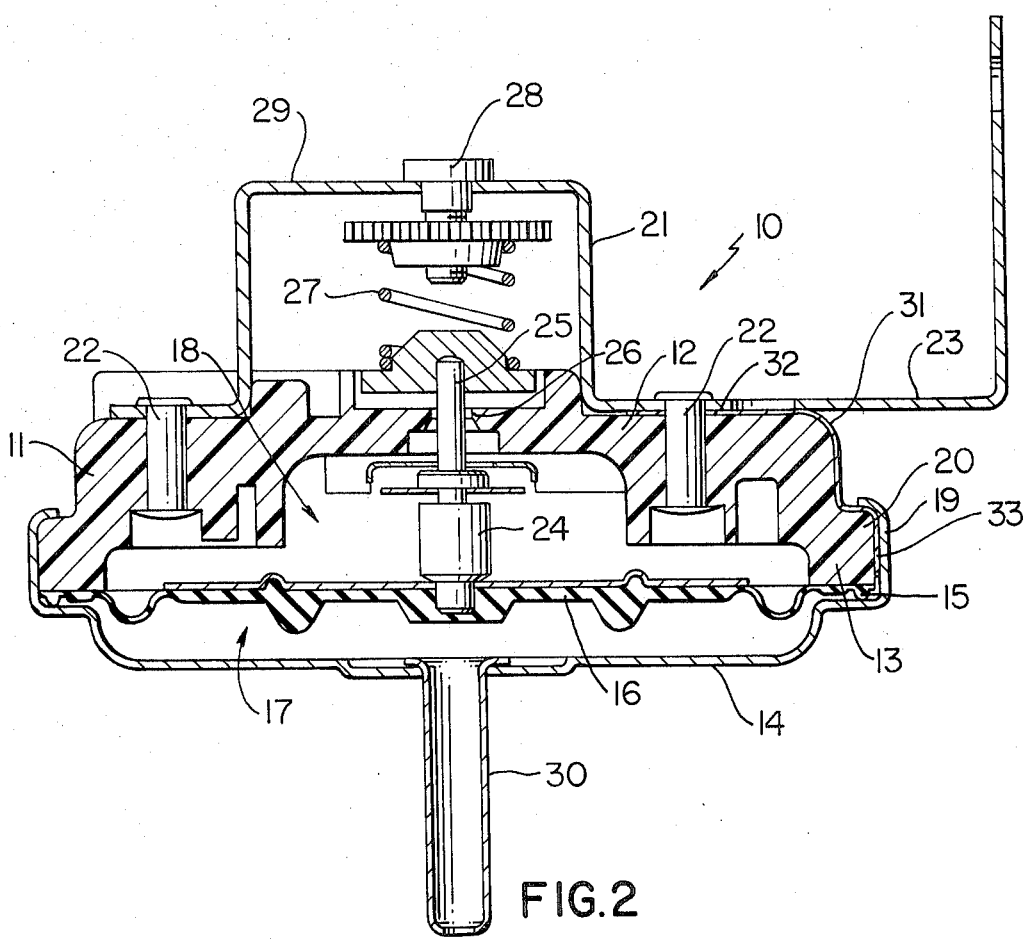
FIG. 2 is an enlarged cross-sectional view taken substantially on the line 2—2 of FIG. 1.

Referring now to FIGS. 1 and 2, the improved water level control device of this invention is generally indicated by the reference numeral 10 and comprises a cup-shaped body member 11 formed of non-conductive material, such as molded plastic material, having a closed end 12 and an open end 13. A metallic cover member 14 holds the outer periphery 15 of a flexible diaphragm 16 in sealed relation against the open end 13 of the cup-shaped housing member 12 while forming a sealed chamber 17 between the cover member 14 and diaphragm 16. The diaphragm 16, in turn, defines a sealed chamber 18 between the diaphragm 16 and the closed end 12 of the cup-shaped housing member 11.

The cover member 14 has its outer peripheral portion 19 crimped or otherwise turned over an outwardly directed annular flange 20 of the cup-shaped housing member 12 at its open end 13 thereof to not only secure the cover member 14 to the body member 11, but also to secure the diaphragm 16 in place.

A metallic bracket member 21 is fastened to the body member 11 by suitable fastening means 22, such as metallic rivets as illustrated. The bracket 21 can have an L-shaped end portion 23 which is adapted to be secured to the grounded frame structure of a washing machine (now shown) in a conventional manner so that the mounting bracket 21 will be fully grounded when the same is mounted in such washing machine or other similar apparatus.

As is well known in the water level control art, the flexible diaphragm 16 operates an electrical switch plunger member 24 which has a stem 25 projecting out through an opening 26 in the closed end 12 of the body member 11 and is being urged downwardly by a compression spring 27 that can have its compression force adjusted by an adjusting member 28 carried by a U-shaped portion 29 of the bracket 21 as illustrated. Since the operation of a water level control device in a domestic washing machine is well known in the art, further description of the details and operation of the water level control device 10 is not necessary for a full understanding of the features of this invention.

However, it can readily be seen that the conductive cover member 14 and its nipple means 30 that is to be fluidly interconnected to a conduit means that will have its lower end submerged in the washing compartment of the washing machine in the usual manner, are completely electrically isolated from the grounded mounting bracket 21 by the non-conductive body member 11.

Therefore, it has been found according to the teachings of this invention that the cover member 14 can also be grounded to the frame structure to prevent an electrical potential build-up thereon by utilizing a conductive strap 31 of this invention that will electrically interconnect together the mounting bracket 21 and the cover member 14.

In particular, the conductive strap 31 of this invention has one end 32 thereof fastened to the non-conductive body member 11 by the same fastening member 22 that fastens the bracket 21 thereto whereby the end 32 of the strap 31 is in electrical contact with the bracket member 21 and is sandwiched between the bracket member 21 and the control device 11 by the fastening member 22. The other end 33 of the conductive strap 31 is crimped between the annular flange 20 of the body member 11 and the crimping peripheral portion 19 of the cover member 14 to not only be secured to the body member 11, but also to be electrically interconnected to the cover member 14 whereby it can be seen that the same securing means that secures the cover member 14 and bracket 21 to the body member 11 also respectively secures the opposed ends 33 and 32 of the conductive strap 31 to the control device 10 and in electrical contact with the cover member 14 and bracket 21 for the reasons previously set forth.

If desired, the strap 31 can be made to conform to the external contour of the body member 11 as illustrated during the crimping operation of the peripheral portion 19 of the cover member 14 to the annular flange 20 of the body member 11.

Thus, since the cover member 14 and bracket 21 must be secured to the body member 11 respectively by the fastening members 22 and the crimped or turned over peripheral portion 19, the securing of the conductive strap 31 in place by such securing means does not add appreciably to the assembly cost of the control device 10 but has advantages of effectively grounding the exposed metal cover 14 to the mounting bracket 21.

Accordingly, it can be seen that this invention not only provides an improved water level control device, but also this invention provides an improved method for making such a water level control device or the like.

While the form of the invention now preferred has been disclosed as required by the patent statutes, other forms may be utilized all coming within the scope of the appended claims.

What is claimed is:

1. In a water level control device having a mounting bracket formed of electrically conductive material and a first part formed of electrically conductive material that is normally spaced from said bracket by a second part formed of electrically insulating material, the improvement comprising a conductive member being carried by said device for the sole purpose of being disposed in contact with said bracket and said first conductive part so that when said bracket is attached to a grounded frame structure, said first conductive part will also be grounded.

2. In a water level control device as set forth in claim 1, the further improvement wherein a fastening member secures said bracket to said control device, said fastening member also fastening said conductive member to said bracket.

3. In a water level control device as set forth in claim 1, the further improvement wherein said first part has a portion thereof secured to said second part of said device, said portion of said first part also being secured to said conductive member.

4. In a water level control device as set forth in claim 3, the further improvement wherein said second part of said device has a flange means and said portion of said first part is crimped over said flange means to secure the same together, said conductive member having one end thereof crimped between said flange means and said portion of said first part.

5. In a water level control device as set forth in claim 4, the further improvement wherein said conductive member comprises a metallic strap having the other end thereof secured between said bracket and said second part, said strap between said ends thereof conforming to the contour of said second part.

6. In a water level control device having a mounting bracket formed of electrically conductive material and at least one exposed part formed of electrically conductive material that is normally spaced from said bracket by another exposed part formed of electrically insulating material so as to be electrically isolated from said bracket, the improvement comprising conductive means being carried by said device for the sole purpose of being disposed in contact with said bracket and all of said exposed conductive parts so that when said bracket is attached to a grounded frame structure, all of said exposed conductive parts will also be grounded.

* * * * *